Sept. 22, 1970  L. C. COWAN  3,529,629
FLUID VALVE WITH PILOT VALVE CONTROL
Filed April 26, 1968
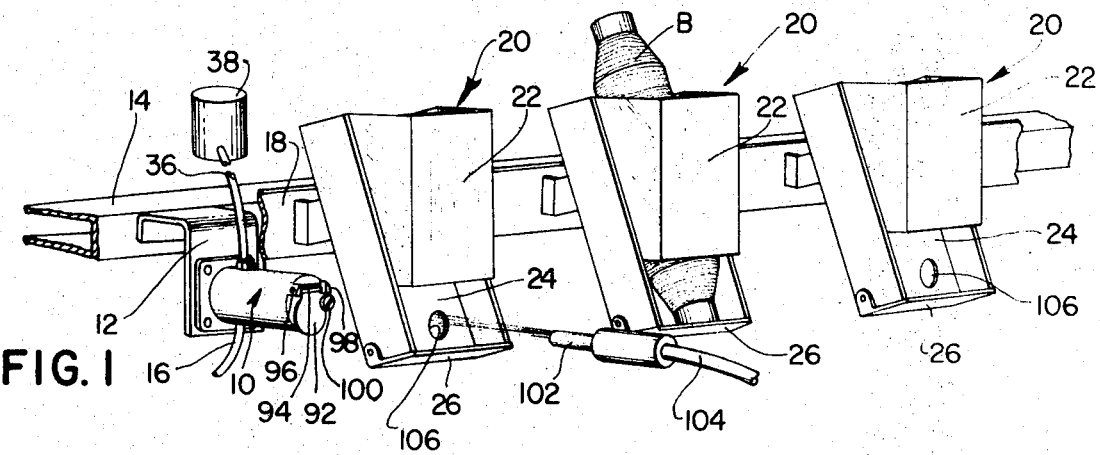
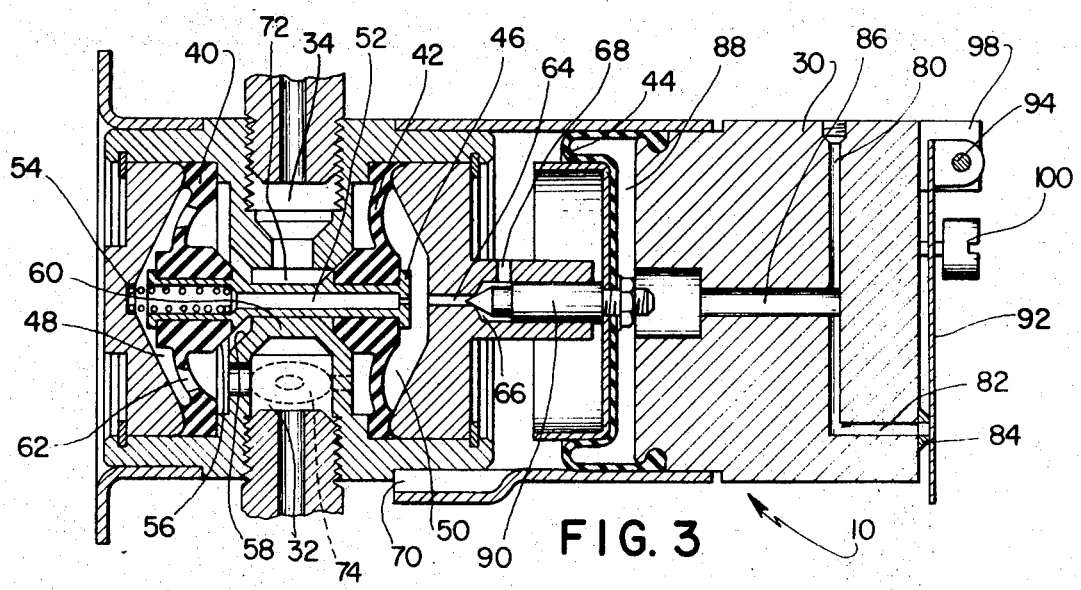
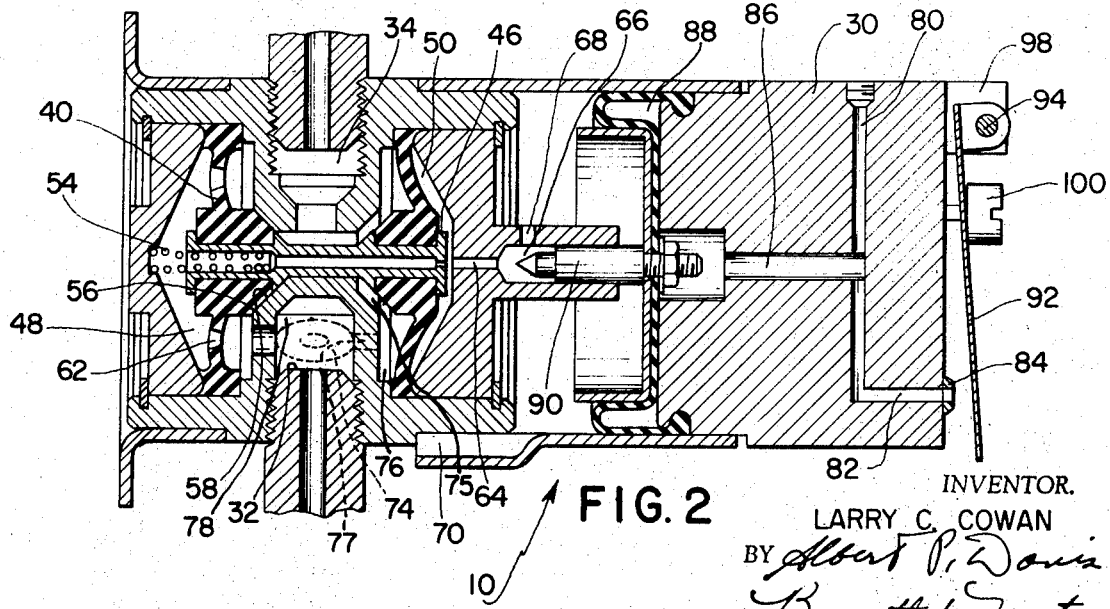
INVENTOR.
LARRY C. COWAN
BY Albert P. Davis
Burnett W. Horton
ATTORNEYS United States Patent Office 3,529,629
Patented Sept. 22, 1970

3,529,629
FLUID VALVE WITH PILOT VALVE CONTROL
Larry C. Cowan, Jamestown, R.I., assignor to Leesona Corporation, Warwick, R.I., a corporation of Massachusetts
Filed Apr. 26, 1968, Ser. No. 724,496
Int. Cl. F16k *11/02, 31/65*
U.S. Cl. 137—625.6          14 Claims

ABSTRACT OF THE DISCLOSURE

A fluid control valve having a pilot valve control. The valve incorporates means for applying pilot air to an actuating piston which is disposed to control the passage of fluid between inlet and outlet ports. Conduit means are provided for bleeding off the pilot air to maintain the piston in a normally closed position where the fluid is prevented from flowing between the inlet and outlet ports. A cover is operable under biasing force to close off the passage of pilot air, thereby creating a back pressure in the valve. This back pressure is communicated to the piston, shifting the piston to an open position, the fluid then being free to pass between the inlet and outlet ports.

BACKGROUND OF THE INVENTION

The present invention relates to valves for controlling the flow of fluids such as air and relates, more particularly, to such valves incorporating means providing for rapid movement of the valves between the open and closed positions.

Fluid control valves of the so-called piloted relay type are well known in the art. Characteristically, these valves are used to relay a signal, as to a work device. Such valves may consist of diaphragms or poppets connected by a main valve stem. In a first position the valve may be either normally open or normally closed, which simply means that the valve is unbalanced to normally hold the valve unseated to permit fluid to flow through the valve (normally open) or, conversely, is unbalanced to normally hold the valve seated and, thus, closed (normally closed). Pilot air is introduced to upset the unbalance and either open the normally closed valve or, on the other hand, close the valve if it is of the normally open type.

In certain situations it is essential that actuation of the valve be effected virtually instantaneously to transmit a signal for initiating a work operation. Additional economy of operation dictates that the valve be operable under low pressure, while the construction of machines with which the valve is used often necessitate that the fluid actuating source be situated a considerable distance from the valve. Prior systems for applying pilot air to actuate the valves have been found relatively slow-acting, and the pilot air required to actuate the valves has been required to be delivered at rather high pressures. Also, the proximity of the pilot air supply to the valve has had to be rather close because of the requirement for focusing the air on the valve.

It is, therefore, an object of the invention to provide a quick-operating piloted relay valve.

A further object of the invention is to provide a quick-acting valve capable of being operated by pilot air under relatively low fluid pressure.

Still, a further object of the invention is to provide a valve having a self-bleeding pilot air system, and means for abruptly halting the bleeding of the pilot air to thereby actuate the valve.

Another object of the invention is to provide a piloted relay valve wherein the pilot air is under the control of a pressure responsive closure, the closure being arranged to be operated by relatively low pressure fluid.

Other objects of the invention will in part be obvious and will in part appear hereinafter.

BRIEF DESCRIPTION OF THE DRAWING

The invention accordingly comprises the apparatus possessing the construction, combination of elements and arrangement of parts which are exemplified in the following detailed disclosure, and the scope of the application which will be indicated in the claims.

For a fuller understanding of the nature and objects of the invention, reference should be had to the following detailed description taken in connection with the accompanying drawing wherein:

FIG. 1 is a fragmentary perspective view of a textile winding machine having travelling supply bobbin conveyers, the winding machine incorporating the instant invention;

FIG. 2 is a view in cross-section of the valve of the present invention, the valve being shown in its normally closed position; and FIG. 3 is a view similar to FIG. 2 illustrating the normally closed valve actuated to its open position.

SUMMARY OF THE INVENTION

In brief, the invention includes a piloted relay valve which may be employed, for example, to relay fluid such as air on actuation which provides a signal for the commencement of work. The valve is actuated by pilot air. This pilot air is fed into the valve at a pressure just below the pressure required to actuate the valve and is bled off by a suitable orifice. When actuation of the valve is required an ancillary pressure source blocks the bleeder orifice thereby causing a backpressure within the valve body sufficient to actuate the valve.

DESCRIPTION OF THE PREFERRED EMBODIMENT

With reference now to FIG. 1 the present invention is illustrated as embodied in a piloted relay valve 10 mounted on a bracket 12 fastened to an elongated frame member 14 constituting a portion of an automatic yarn winding machine. Air is fed into the valve 10 via air hose 16 from any suitable source of compressed air, not herein illustrated. The winding machine is equipped with a travelling belt 18 on which a plurality of bobbin buckets 20 are fastened, at spaced intervals. As is known in conjunction with automatic winding machines, these buckets 20 are arranged to each hold a bobbin B in a generally vertical position and to release the bobbins for downward movement to a yarn supply creel (not shown) on signal. While each bobbin is in its bucket 20 it will be rather loosely contained between an abbreviated front wall 22 and a full rear wall 24 and resting on a swinging gate or door 26. Releasing of each bobbin B is achieved by the opening on signal of the swinging door 26 at the base of each bucket 20 and permitting the bobbin to fall under the force of gravity.

As is further known in the textile art, the buckets 20 are automatically resupplied with fresh wound bobbins as the buckets 20 are emptied. Hence, a complete cycle is effected where the buckets 20 are filled with bobbins B, the bobbins B are conveyed in the user point, i.e., proximate to the supply creels, and the bobbins B are released to the creels as needed.

From the foregoing it is obvious that as each bucket is emptied of its bobbin a work cycle must be commenced if a fresh bobbin is to be readied for delivery to the now-emptied bucket. The signal for such work cycle is relayed via passage of air through valve 10. Accordingly, valve 10 is constituted as a generally cylindrical device having a main body 30 provided with air provided with inlet and outlet ports 32, 34, respectively. For purposes of the present description a normally closed valve is shown in FIGS. 2 and 3. The inlet port 32 is connected to a conventional high pressure air source (not shown) via air hose 16 and the outlet port 34 is connected by means of hose 36 to a work actuator 38, e.g., a fluidic device, air cylinder, electrical switch or the like.

Viewing FIGS. 2 and 3 valve 10 is seen to further include two flexible diaphragms or poppets 40, 42 and a further flexible diaphragm 44, each connected to the interior of body 30 and being capable of being shifted off their seats under pressure. A stem 46 is connected between poppets 40 and 42 and is arranged to slide in conjunction with movements of the poppets to which it is connected. A cavity 48 is provided within body 30 at one side of poppet 40. Similarly, a further cavity 50 is provided adjacent poppet 42. Stem 46 has an axial bore 52 therethrough connecting cavities 48 and 50. A spring 54 is positioned surrounding the lower section of stem 46 to bias stem 46 and poppets 40, 42 and diaphgram 44 to the left as seen in FIGS. 2 and 3.

Fluid flow from inlet port 32 to outlet port 34 is controlled by the positioning of a beveled sealing face 56 on poppet 40 relative to a mating face 58 on a gate 60, said gate being an integral part of the valve body 30. If the sealing face 56 of poppet 40 is engaged with face 58 on gate 60 as shown in FIG. 2, the valve is closed and fluid is prevented from flowing past the gate to the outlet port 34. In this event the air will simply flow through a vent port 62 in poppet 40, into cavity 48, upward trough bore 52 in stem 46 and will flood into cavity 50. To vent this pressure a canal 64 leads off from cavity 50. An opening 66 is connected with canal 64 and a further port 68 leads from opening 66 to an exhaust passage 70. Thus, the air in cavity 50 continues its flow through canal 64, opening 66, port 68 and out to atmosphere through exhaust passage 70. The valve as illustrated in FIG. 2 is shown arranged for such passage of air. That is, the valve as seen in FIG. 2 is in the closed position.

In FIG. 3 the valve is depicted in its open or actuated position. Here, face 56 has separated from face 58. In this condition the air can pass between these faces, through the cavity 72 around stem 46 and out through port 34.

Once the valve has been actuated and the air through outlet port 34 is shut down the supply line at the outlet port will be vented as the air flows back through cavity 72 and out of exhaust port 74. In flowing to exhaust port 74 the air flows out of cavity 72, through passage 75 and cavity 76 and downwardly through an aperture 77 connecting with port 74. Said port 74 is separated from cavity 72 by means of a wall 78. This latter position is most evident in FIG. 2.

It has already been stressed that quick actuation of the valve is desirable and, indeed, essential in certain operations to produce a rapid signal to actuator 38. To this end the right-hand end of valve 10 (viewing FIGS. 2 and 3), is arranged with a self-bleeding pilot air system. Thus, body 30 has a radial bore or passage 80 drill therein. A further passage 82 connects with passage 80 and opens outwardly into an orifice 84 at end of valve body 30. An axial opening 86 joins into passage 80 intermediate the ends of said passage 80. The opposite end of opening 86 connects with a cavity 88 adjacent one side of diaphragm 44. Said poppet 44 is provided with a needle valve 90 extending in a direction toward the aforementioned canal 64 and, in fact, said needle valve is arranged to arrest the flow of air through canal 64 upon actuation of diaphragm 44.

As best seen in FIG. 1 the end of valve 10 having orifice 84 thereat also mounts a rather lightweight cover 92 for free-swinging movement. It should be noted that cover 92 is flared or enlarged to correspond substantially in surface area to the end dimension of valve 10. Cover 92 is hinged on a pintle 94 bridged between ears 96, 98 formed in the outer end of valve 10. A stop 100 is fixed in the end wall of valve 10 and situated to control the outward swing of cover 92.

In operation a source of compressed air, which may be rather light, is fed into passage 80. This air represents the pilot air and is bled off through passage 82 and out orifice 84 when valve 10 is to be held closed. This pilot air is fed through passages 80, 82 at a pressure just below the pressure required to actuate diaphragm 44 to shift needle valve 90 into seating position at the end of canal 64, as shown in FIG. 3. In this condition cover 92 swings freely open as shown in FIG. 2 to allow the venting of the pilot air.

With reference once again to FIG. 1 it may occur that a signal is desired when a bucket 20 passes a fixed point without a bobbin therein. The signal, of course, could incite work actuator 38 to ready another bobbin for delivery to the empty bucket. In such arrangement a jet 102 is connected via hose 104 to an air pressure source, not shown, and is arranged to emit air focused at a hole 106 through the rear wall 24 of bucket 20, the hole 106 being aligned with cover 92 of valve 10. The air is emitted from jet 102 toward hole 106 in timed sequence with the arrival of each bucket 20 in the zone between valve 10 and jet 102. During the intervals when no bucket is present in the zone in front of air jet 102, the air is shut down by any suitable control means not herein shown. Furthermore, as is evident in FIG. 1 the front wall 22 of bucket 20 does not interfere with the flow of air to hole 106, since said wall 22 terminates upwardly of the flow path of the air passing from jet 102 to hole 106. As seen in FIG. 1, so long as a bobbin is present in each bucket 20 the air emitted from jet 102 is blocked from cover 92. However, in the absence of a bobbin in any bucket the air stream from jet 102 will blow cover 92 shut over orifice 84. Obviously, the enlarged circular configuration of cover 92 provides a convenient target for the air from jet 102 and requires very low air pressure to be blown shut. Closing cover 92 will cause a momentary back-pressure to develop in passage 80. This back pressure will push the air in opening 86 against diaphragm 44 whereupon needle valve 90 will shut off the escape of pressurized air through exhaust passage 70. With the pressurized air entering inlet port 32 thus blocked this air will build momentarily in cavity 50 to create an unbalanced condition toward the open valve position, then poppets 40 and 42 will be thrust to the left (FIGS. 2 and 3) or downward. As a result the sealing faces 56 and 58 of the valve are separated to permit passage of air to outlet port 34 to yield an air pulse. This condition of unbalance will last momentarily (coterminous with the duration of the backpressure). Then the normal unbalanced condition, i.e., the normally open or closed position of the valve, will be resumed as the diaphragm 40, 42 and diaphragm 44, aided by spring 54, bias elements back to their normal position. At this time sufficient air will have passed through ports 32 and 34 to actuate work actuator 38.

The following results were produced with the present invention fitted to a Model No. 250AL valve manufactured by Humphrey Products, Kalamazoo, Mich., the arrangement being in accordance with that illustrated in FIGS. 2 and 3. In a first series of tests the valve was provided with a cover 92 of 1⅛ inches in diameter and air pressure of 80 p.s.i. Stop 100 was set to afford a maximum clearance of .050 inch between cover 92 and orifice 84. The orifice diameter was .092 inch. The air pressure to passage 80 was set as a 4 inch water column. The pressure of air from jet 102 required to shut cover 92 on orifice 84 was as follows:

| Distance from front of jet 102 to cover 92 (in inches): | Pressure of air from jet 102 required to close cover 92 (in p.s.i.) |
|---|---|
| 1 | <1 |
| 2 | <1 |
| 3 | 1 |
| 4 | 2 |
| 5 | 2 |
| 6 | 3 |
| 7 | 3 |
| 8 | 4 |
| 9 | 4 |
| 10 | 5 |
| 11 | 5 |
| 12 | 6 |
| 14 | 9 |

The same test as that described above was run, the only difference being to increase the diameter of cover 92 to 1¾ inches. The results were as follows:

| Distance from front of jet 102 to cover 92 (in inches): | Pressure of air from jet 102 required to close cover 92 (in p.s.i.) |
|---|---|
| 8 | 1 |
| 9 | 2 |
| 10 | 2 |
| 11 | 3 |
| 24 | 10 |

From the foregoing it will be appreciated that the present provides a quick-acting piloted relay valve capable of operating reliable under low pressure pilot air to produce an accurate signal to a work actuator.

What is claimed is:

1. A valve having inlet and outlet ports for the passage of fluid, a passage connecting the inlet and outlet ports, pressure responsive means disposed to control the passage of fluid between said inlet and outlet ports and operable in a first position to permit passage of fluid from said inlet port to said outlet port and operable in a second position to prevent passage of fluid from said inlet to said outlet port, biasing means connected with said pressure responsive means for urging said pressure responsive means to a one of said first and second positions, conductor means communicating with said pressure responsive means and operable to present a pressurized fluid to said pressure responsive means to urge said pressure responsive means in a direction opposite to that of said biasing means, bleeder means associated with said conductor means and operable when open to exhaust said pressurized fluid to preclude movement of said pressure responsive means in said opposite direction, and operative means arranged to close said bleeder means to produce a pressure in said conductor means for moving said pressure responsive means in said opposite direction.

2. Apparatus as set forth in claim 1 wherein the fluid in said conductor means is maintained at a value below the pressure required to urge said pressure responsive means in said opposite direction, said operative means upon closing producing a back pressure of a value to urge said pressure responsive means in the opposite direction.

3. Apparatus as set forth in claim 1 wherein said pressure responsive means includes first flexible means carrying fluid regulating means for controlling the passage of fluid to said outlet port, said first flexible means being actuatable under pressure to shift said fluid regulating means to a one of said first and second positions.

4. Apparatus as set forth in claim 2 wherein said pressure responsive means further includes second flexible means associated with said conductor means and being responsive to a predetermined pressure in said conductor means to actuate said first flexible means.

5. Apparatus as set forth in claim 4 wherein the fluid in said conductor means is maintained at a value below the pressure required to operate said second flexible means for actuating said first flexible means, said operative means upon closing producing a back pressure of a value to operate said second flexible means.

6. A valve for use with a textile machine having a plurality of movable bobbin carriers and means operable on signal to deliver a bobbin to a one of said bobbin carriers; said valve comprising, a body having inlet and outlet ports for the passage of fluid, a passage connecting the inlet and outlet ports, pressure responsive means in said body and disposed to control the passage of fluid between said inlet and outlet ports, said pressure responsive means being operable in a first position to permit passage of the fluid from said inlet port to said outlet port and operable in a second position to prevent fluid passage from said inlet to said outlet port, biasing means connected with said pressure responsive means for urging said last mentioned means to a one of said first and second positions, conductor means communicating with said pressure responsive means and operable to present a pressurized fluid to said pressure responsive means to urge said pressure responsive means in a direction opposite to that of said biasing means, bleeder means associated with said conductor means and operable in an open position to exhaust said pressurized fluid to preclude movement of said pressure responsive means in said opposite direction, and operative means arranged with said bleeder means for closing the bleeder means responsive to the absence of a bobbin in a bobbin carrier to produce a pressure for moving said pressure responsive means in said opposite direction to produce a signal for readying a further bobbin for delivery to said carrier.

7. Apparatus as set forth in claim 6 wherein said operative means includes a cover for shutting off said bleeder means, and a source of compressed fluid for biasing said cover shut.

8. Apparatus as set forth in claim 7 wherein each said carrier is provided with an aperture in alignment with said cover, said source of compressed fluid being arranged to discharge said fluid through said aperture at said cover in the absence of a bobbin in said carrier.

9. Apparatus as set forth in claim 6 wherein the fluid in said conductor means is maintained at a value below the pressure required to urge said pressure responsive means in said opposite direction, said operative means upon closing producing a back pressure of a value to urge said pressure responsive means in the opposite direction.

10. Apparatus as set forth in claim 6 wherein said pressure responsive means includes first flexible means carrying fluid regulating means for controlling the passage of fluid to said outlet port, said first flexible means being actuatable under pressure to shift said fluid regulating means to a one of said first and second positions.

11. Apparatus as set forth in claim 10 wherein said pressure responsive means further includes second flexible means associated with said conductor means and being responsive to a predetermined pressure in said conductor means to actuate said first flexible means.

12. Apparatus as set forth in claim 11 wherein the fluid in said conductor means is maintained at a value below the pressure required to operate said second flexible means for actuating said first flexible means, said operative means upon closing producing a back pressure of a value to operate said second flexible means.

13. A pressure responsive valve comprising, pressure responsive means, conductor means communicating with said pressure responsive means for presenting a pressurized fluid to said pressure responsive means, said pressurized fluid being at a pressure below that required to move said pressure responsive means from an unactuated to an actuated position, bleeder means associated with said conductor means and operable when open to exhaust said fluid from said pressure responsive means and thereby maintain said pressure responsive means in said unactuated position, and operative means arranged to close said bleeder means to thereby produce a back pressure in said conductor means, said back pressure being of a value for actuating said pressure responsive means.

14. A system as set forth in claim 13 wherein said operative means is a cover operable to seal said bleeder means; and means for directing a stream of pressurized fluid at said cover to close the cover on said bleeder means.

References Cited

UNITED STATES PATENTS

| | | | |
|---|---|---|---|
| 2,836,153 | 5/1958 | Dyson | 251—29 XR |
| 2,964,057 | 12/1960 | Dyson | 137—625.6 |

H. T. KLINKSIEK, Primary Examiner